Patented July 10, 1945

2,380,092

UNITED STATES PATENT OFFICE 2,380,092

COFFEE PRODUCT

Mark Weisberg, Providence, R. I., assignor to Bellefont Associates, Cranston, R. I.

No Drawing. Application May 1, 1942,
Serial No. 441,343

4 Claims. (Cl. 99—71)

This invention relates to water-soluble coffee beans in the form or shape and approximate size of the natural coffee beans. My invention also relates to water-soluble coffee beans, not only in the form or shape and the approximate size of a coffee beans but also having the color of roasted coffee beans on the exterior of each individual bean as well as the aroma thereof.

It has long been a common practice to provide aqueous extracts of coffee either as a concentrated thick liquid product or as a powder. To make such powders or syrups it has been suggested to add various materials during the manufacturing operations or embody these with the aim of rendering unnecessary the separate addition of other materials on the part of an individual consumer in making a cup of ready-to-serve coffee, other than hot water. Some of these powders having as a base water-soluble extracts of roasted coffee, have been placed on the market in the form of tablets or cubes or fairly large sized cakes. But in none of these or like products known to applicant either in the trade or written descriptions thereof is there unique attractiveness. By utilizing the bean form the psychological sales resistance is overcome, inasmuch as the purchaser is not accustomed to see coffee except in the bean form.

Applicant has found that when water-soluble extracts of roasted coffee and substitutes thereof are made into compact forms which simulate or duplicate the shape of the actual coffee beans and the approximate size, the association of the aroma, the bouquet and pleasant taste of properly roasted and blended coffee beans is axiomatic. The prepared coffee extract or powder from roasted coffee or any substitute thereof made into the form and size of coffee beans further provides a convenient means of measurement; one or two of such compact beans are quickly counted, representing a cup of coffee.

When water-soluble coffee extracts are marketed in the powdered form, the very hydroscopic nature of this material causes caking. This renders packaging difficult. Since there is a large surface exposure of the individual powder particles, after opening the container over a period of days the mass ,especially at the upper portion, becomes hard and difficult to remove portion-wise. On the other hand when the water-soluble coffee powder or other physical type of the water-soluble extract, is formed or compressed into the shape of coffee beans, especially when followed by a subsequent roasting operation, the product becomes moisture-proof. The roasting of the compact shaped product confers this extra moisture-proof nature and this property is not to be attained by a roasting in the powdered condition. Tablets made from the aqueous extract of roasted coffee beans lack this moisture-proof property too. Applicant thus avoids coating cakes, tablets or pellets with water-proof coating such as cocoa-butter a treatment which has previously been suggested.

There is no particular formula which goes into the composition except that the components are characterized by a coffee extract base; appropriate substitute thereof or a combination of extract base and any synthetic substance for such purpose; the entire mass must be soluble or soluble in the main in cold or hot water. That composition is preferred which when a whole bean thereof is ground or macerated it will result in a powder. The manner in which the coffee beverage composition is shaped is not a limitation. For commercial purposes, those compositions will be chosen or selected which have the nearest taste and appearance in the finished cup (ready to serve) to the freshly brewed cup of coffee. Those shaping methods will be selected which are both economical as well as practical and which give beans having the shape and sheen of the roasted beans.

A method with variations thereon for the preparation of the simulated coffee beans is compressing the granulations between polished steel dies and punches or other metals. The color imparted to these beans formed in the shape of the actual coffee beans can be brought out and made to similate the natural well roasted beans by a light roast. This roast is a finishing step and is separate from and not to be confused with the initial roasting prior to making the extract from the natural coffee bean. An additional advantage of this light roast is that an additional aroma is brought out. When powdered coffee is made, the natural coffee aroma is dissipated. So a light roast subsequent to shaping the bean revitalizes the aroma. Furthermore this light roast serves to glaze the beans thus making them non-porous, non-staling and non-hydroscopic.

Various components may be selected to form the composition from which the beans are made. One suitable composition is that from dextrose and coffee solids in the ratio of 1:1 (the coffee solids are the residue from the evaporation of an aqueous extract from roasted coffee). Various sweetening agents may be employed in this or other formulae such as sucrose, galactose, lactose, maltose or soluble-saccharine. The ingredients may be flavored by the addition of various flavoring agents such as diacetyl, coumarin, vanillin, mercaptans, etc. The components may be colored by the addition of various coloring agents such as caramel, chicory, food colors or as previously explained by a light roasting or both a combination of added coloring agents and a light roasting. The components may contain various diluents or food elements such as milk, powdered cream, gelatine or starch. In any case the basic nature of this invention is not changed.

As specific examples of methods of making coffee extracts in the form of natural coffee beans, and of the size or approximate size, I give the following.

Example I 100 g. of the aqueous extract from roasted coffee analyzing 80% solids is mixed with 30 g. of anhydrous $KH_2PO_4$. This is stirred until the materials have solidified, then the mass is pressed into the shape and size of coffee beans. These beans are roasted at 150° C. for 2–5 minutes. While this subsequent roast can be omitted, it is desirable as has been pointed out supra.

Example II 100 g. of the aqueous extract from roasted coffee analyzing 25% coffee solid is mixed with corn syrup containing dextrose, dextrine and maltose to give an additional 25% solids. This mixture is spray dried or vacuum dried and the powder therefrom is compressed into the shape of coffee beans.

In place of the natural coffee extract or powder, substitutes therefor may be fabricated into the simulated coffee bean by the aforementioned methods. Synthetic coffee extracts may be combined with such substances as are known in the art for the production of water soluble tablets. Likewise such powdered coffee substitutes as described below may be compressed directly into the shape of beans.

A

| | Ounces |
|---|---|
| Roasted whole wheat | 75 |
| Roasted whole rye | 20 |
| Flaxseed | 5 |

B

| | |
|---|---|
| Roasted barley | 90 |
| Roasted bran | 5 |
| Dry figs | 5 |

C

| | |
|---|---|
| Roasted whole wheat | 75 |
| Roasted soy bean middlings | 25 |

Other auxiliary or ancillary agents may be incorporated into this product which are designed to improve the preparation, keeping powers, or other benefits derived from the consumption thereof. Thus, anti-oxidants such as thiosulphate, chloracetic, sodium benzoate, butuben, wheat germ oil, crystalline vitamins, or vitamin concentrates such as vitamin $B_1$, vitamin $B_1$ complex, nicotinic acid, nicotinamide, riboflavin, ascorbic acid, etc., may be incorporated therein.

Other modifications will occur to persons skilled in the beverage preparation art.

What I claim is:

1. The process of making artificial coffee beans which are substantially non-staling and non-hydroscopic, comprising mixing the extract from roasted coffee with a solution containing 25% to 30% of solids of the group consisting of potassium acid phosphate and corn syrup, concentrating the mixture to a solid, compressing the solidified mass into the shape and size substantially of a coffee bean, lightly roasting the compressed beans to bring out the aroma and give them the glaze and the color substantially of the natural coffee beans, and a surface that is non-porous.

2. The process of making artificial coffee beans which are substantially non-staling and non-hydroscopic, comprising mixing an extract of roasted coffee analyzing high in coffee solids with anhydrous potassium dihydrogen phosphate, stirring until solidified, compressing into the shape and size substantially of the natural coffee bean, giving the compressed beans a light roast for a few minutes whereby the individual beans simulate the color of natural roasted coffee beans, the aroma is intensified and the beans take on a glaze.

3. The process of making artificial coffee beans which are substantially non-staling and non-hydroscopic, comprising mixing an extract of roasted coffee having at least 25% of coffee solid with corn syrup to give at least 25% of additional solids, spray-drying the mixture, compressing the powdered mass into the shape and size substantially of coffee beans, giving the compressed mass a light roast for a few minutes to revitalize the aroma and develop the natural color of the coffee bean and develop a surface that is non-porous.

4. The process of producing a substantially water-soluble, non-staling, non-hydroscopic product comprising compressing a substantially solid composition, comprising water-soluble extract of roasted coffee, into the form and size substantially of natural roasted coffee beans, then roasting said beans to intensify the aroma, to confer a color on the exterior simulating the color of natural roasted coffee beans and to produce a non-porous exterior.

MARK WEISBERG.